US009759282B2

(12) United States Patent
Ura et al.

(10) Patent No.: US 9,759,282 B2
(45) Date of Patent: Sep. 12, 2017

(54) AIR SPRING

(71) Applicant: SUMITOMO ELECTRIC INDUSTRIES, LTD., Osaka-shi, Osaka (JP)

(72) Inventors: Yasuhiko Ura, Osaka (JP); Hirokazu Haraguchi, Osaka (JP); Takayuki Sawa, Osaka (JP); Jun Yoshida, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 160 days.

(21) Appl. No.: 14/122,454

(22) PCT Filed: Apr. 1, 2013

(86) PCT No.: PCT/JP2013/059920
§ 371 (c)(1),
(2) Date: Nov. 26, 2013

(87) PCT Pub. No.: WO2014/020942
PCT Pub. Date: Feb. 6, 2014

(65) Prior Publication Data
US 2015/0219177 A1   Aug. 6, 2015

(30) Foreign Application Priority Data
Jul. 30, 2012   (JP) .................................. 2012-168223

(51) Int. Cl.
*F16F 9/05* (2006.01)
*F16F 9/04* (2006.01)

(52) U.S. Cl.
CPC .................. *F16F 9/05* (2013.01); *F16F 9/04* (2013.01); *F16F 2224/0241* (2013.01); *F16F 2230/24* (2013.01)

(58) Field of Classification Search
CPC .... F16F 9/05; F16F 9/0454; F16F 9/50; F16F 13/002; B60G 2202/152; B60G 2204/126;
(Continued)

(56) References Cited

U.S. PATENT DOCUMENTS 2,920,885 A    1/1960 Niclas
4,398,704 A *  8/1983 Buchanan, Jr. ........ B60G 11/28
                                                      267/64.21
(Continued)

FOREIGN PATENT DOCUMENTS

CN    101344133 A    1/2009
CN    102165213 A    8/2011
(Continued)

OTHER PUBLICATIONS

English machine transalation of JP-2009-138905 (from IDS).*
Machined translation of WO-2012115183 (Description only).*

*Primary Examiner* — Robert A Siconolfi
*Assistant Examiner* — San Aung
(74) *Attorney, Agent, or Firm* — Drinker Biddle & Reath LLP

(57) ABSTRACT

An air spring includes a top plate, a bottom plate disposed with a distance in a main load direction from the top plate, and a diaphragm made of elastically deformable rubber and connected to the top plate and the bottom plate to form a closed space therebetween. A modulus of elasticity of a material constituting a connection section which is disposed in the top plate and the bottom plate and connected to the diaphragm is greater than a modulus of elasticity of the rubber constituting the diaphragm and smaller than a modulus of elasticity of aluminum.

10 Claims, 3 Drawing Sheets

(58) Field of Classification Search
CPC .. B60G 2206/424; B60G 11/27; B60G 11/62; B61F 5/10; B61F 5/02; B29D 22/023
USPC .......... 267/64.27, 3, 35, 64.24; 280/124.16; 105/198.1
See application file for complete search history.

(56) References Cited

U.S. PATENT DOCUMENTS

| | | | |
|---|---|---|---|
| 6,250,613 B1* | 6/2001 | Koeske | B60G 11/28 267/122 |
| 6,257,561 B1* | 7/2001 | Nakayama | F16F 9/05 267/122 |
| 2003/0057623 A1* | 3/2003 | Maeno | F16F 7/108 267/292 |
| 2009/0057966 A1* | 3/2009 | Leonard | F16F 9/0409 267/64.27 |
| 2009/0065989 A1* | 3/2009 | Leonard | B60G 11/27 267/64.27 |
| 2009/0278289 A1* | 11/2009 | Gawinski | B60G 13/10 267/64.27 |
| 2011/0031662 A1* | 2/2011 | Toyama | B61F 5/02 267/121 |
| 2011/0233832 A1 | 9/2011 | Sawa et al. | |
| 2012/0061887 A1* | 3/2012 | Westnedge | B60G 11/27 267/64.24 |
| 2012/0240817 A1* | 9/2012 | Bujeau | B29D 22/023 105/453 |

FOREIGN PATENT DOCUMENTS

| | | |
|---|---|---|
| CN | 102588489 A | 7/2012 |
| JP | H11-351307 A | 12/1999 |
| JP | 2002-293119 A | 10/2002 |
| JP | 2009-138905 A | 6/2009 |
| WO | WO-2012115183 * | 8/2012 |

* cited by examiner

AIR SPRING

TECHNICAL FIELD

The present invention relates to an air spring, and more particularly, relates to an air spring capable of preventing air from leaking out of a diaphragm.

BACKGROUND ART

In a railroad vehicle, an air spring is disposed between a bodywork and a truck in order to alleviate impacts and vibrations imposed on the bodywork in travelling. The air spring generally includes a top plate connected to the bodywork, a bottom plate disposed on the truck, and a rubber diaphragm disposed to connect the top plate and the bottom plate to each other. The diaphragm can alleviate impacts and vibrations while the vehicle is travelling through elastic deformation. As a constituent material for members such as the top plate and the bottom plate, from the viewpoint of ensuring abrasion resistance and strength thereof, metal such as aluminum or iron is commonly adopted (for example, see Japanese Patent Laying-Open No. 2009-138905 (PTD 1)).

CITATION LIST

Patent Document

PTD 1: Japanese Patent Laying-Open No. 2009-138905

SUMMARY OF INVENTION

Technical Problem

In the case where metal such as aluminum or iron is adopted as a material for constituting the top plate and the bottom plate, the difference of modulus of elasticity between the constituent material and rubber constituting the diaphragm is great (aluminum: about 70 GPa, iron: about 200 GPa, and rubber: about 0.1 GPa). Therefore, for example, in the case where the diaphragm deforms greatly, due to the difference of modulus of elasticity, it is easy to have a gap formed in a contact section between the top plate and the diaphragm or between the bottom plate and the diaphragm, and consequently, there arises such a problem that air leaks out of the diaphragm.

The present invention has been accomplished in view of the aforementioned problems, and it is therefore an object of the present invention to provide an air spring capable of preventing air from leaking out of a diaphragm.

Solution to Problem

The air spring according to the present invention includes a first support member, a second support member disposed with a distance in a main load direction from the first support member, and a diaphragm made of elastically deformable rubber and connected to the first support member and the second support member to form a closed space therebetween. In at least one member of the first support member and the second support member, a modulus of elasticity of a material constituting a connection section connected to the diaphragm is greater than a modulus of elasticity of the rubber constituting the diaphragm and smaller than a modulus of elasticity of aluminum.

According to the air spring of the present invention, in the first support member and/or the second support member, the material constituting the connection section connected to the diaphragm has the modulus of elasticity mentioned above. Therefore, in comparison with the case where the connection section is made of iron or aluminum, the difference of modulus of elasticity between the material constituting the connection section and the rubber constituting the diaphragm is smaller. Thereby, it is possible to prevent a gap, which is caused by the difference of modulus of elasticity, from being formed in the connection section between the first support member and the diaphragm and/or between the second support member and the diaphragm. Thus, according to the air spring of the present invention, it is possible for the air spring to prevent air from leaking out of the diaphragm.

In the air spring, it is acceptable that the modulus of elasticity of the material constituting the connection section in the at least one member is not less than 1 GPa and not more than 40 GPa.

Accordingly, it is possible to prevent a gap from being formed in the connection section between the first support member and the diaphragm and/or between the second support member and the diaphragm more effectively, and consequently, it is possible to prevent air from leaking out of the diaphragm more effectively.

In the air spring, it is acceptable that the connection section is made of FRP. Thereby, it is possible to make the air spring lighter.

In the air spring, it is acceptable that FRP constituting the connection section is formed through a press molding method. Thereby, it is possible to further improve the workability of the first support member and/or the second support member which include therein the connection section.

In the air spring, it is acceptable that the at least one member includes the connection section and a lightweight section having a smaller mass per unit volume than the connection section. Thereby, it is possible to make the air spring further lighter.

In the air spring, it is acceptable that the lightweight section is made of a honeycomb structure. Further, it is acceptable that the lightweight section is made of a foamed material. Furthermore, it is acceptable that the lightweight section is made of engineering plastic excluding FRP. Thereby, it is easier to make the air spring lighter.

In the air spring, it is acceptable that the connection section is made of FRP excluding CFRP and the lightweight section is made of CFRP. Thereby, it is possible to make the air spring further lighter.

In the air spring, it is acceptable that the at least one member includes the connection section and a reinforcement section made of a material having a greater modulus of elasticity than the connection section. Thereby, it is possible to further improve the strength of the air spring while preventing air from leaking out of the diaphragm.

In the air spring, it is acceptable that a member made of metal is disposed on at least one of a surface of the first support member facing the second support member and a surface of the second support member facing the first support member. Thereby, it is possible to further improve abrasion resistance of the first support member and/or the second support member in the case where the first support member and the second support member contact each other when the air spring is deflated or during a fast speed travelling. Moreover, it is possible to improve the strength of the first support member and/or the second support member.

Being deflated means that air is expelled out of the diaphragm of the air spring and the air spring is in a blowout state.

In the air spring, it is acceptable that a member made of resin is disposed on at least one of a surface of the first support member facing the second support member and a surface of the second support member facing the first support member. Thereby, it is possible to further improve sliding property between the first support member and the second support member in the case where the first support member and the second support member contact each other when the air spring is deflated.

Advantageous Effects of Invention

From the description in the above, it is obvious that the present invention can provide an air spring capable of preventing air from leaking out of the diaphragm.

DESCRIPTION OF EMBODIMENTS

Figure 1:
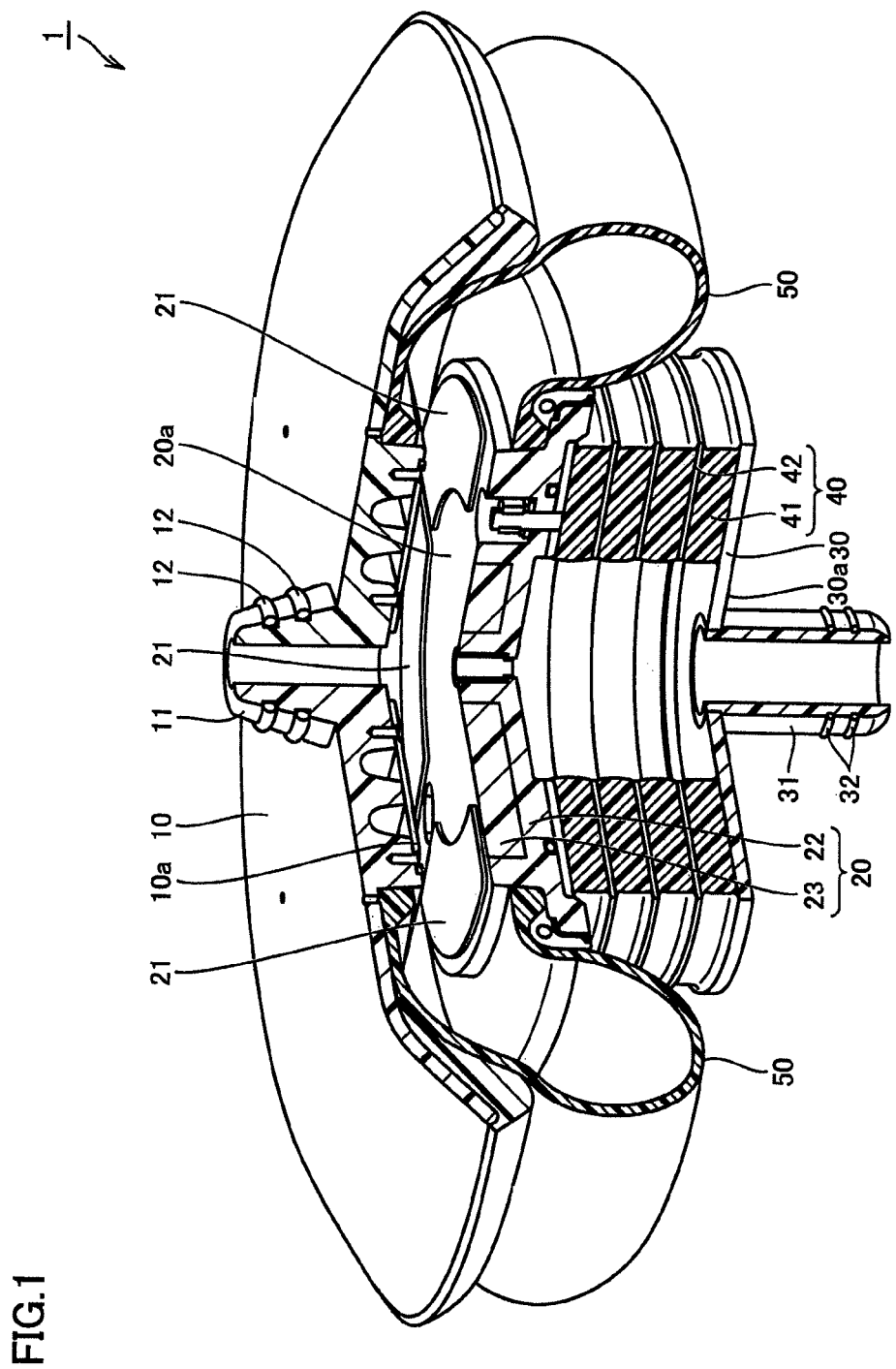
FIG. 1 is a schematic view illustrating a structure of an air spring.

Hereinafter, an embodiment of the present invention will be described with reference to the drawings. It should be noted that in the drawings mentioned below, the same or corresponding portions will be given the same reference numbers and the description thereof will not be repeated.

First, the structure of an air spring according to an embodiment of the present invention will be described. With reference to FIG. 1, an air spring 1 of the present embodiment mainly includes a top plate 10 serving as a first support member, a bottom plate 20 serving as a second support member, a lower rubber plate 30, a laminated rubber layer 40, and a diaphragm 50.

A bodywork-side spigot 11 is formed in a region containing the central axis of top plate 10, protruding toward the side opposite to bottom plate 20. An O-ring 12 is fixed around the periphery of bodywork-side spigot 11. Top plate 10 is connected to the bodywork (not shown) through the intermediary of bodywork-side spigot 11.

Bottom plate 20 is disposed with a distance in a main load direction when viewed from top plate 10. A surface 20a of bottom plate 20 facing top plate 10 is disposed with a slide member 21 which is made of, for example, metal or resin. Slide member 21 may be disposed on at least one of a surface 10a of top plate 10 facing bottom plate 20 and surface 20a of bottom plate 20 facing top plate 10, or may be disposed on surface 10a, or may be disposed respectively on both surface 10a and surface 20a.

Diaphragm 50 is made of elastically deformable rubber and connects top plate 10 and bottom plate 20 to form a closed space therebetween. More specifically, both ends of diaphragm 50 are supported respectively on top plate 10 and bottom plate 20. Thereby, diaphragm 50, top plate 10 and bottom plate 20 form a closed space. In at least one member of top plate 10 and bottom plate 20, a modulus of elasticity of a material constituting a connection section connected to diaphragm 50 is greater than a modulus of elasticity of the rubber constituting diaphragm 50 and smaller than a modulus of elasticity of aluminum. More specifically, the modulus of elasticity of the material constituting the connection section is not less than 1 GPa and not more than 40 GPa, and the connection section is made of FRP (Fiber Reinforced Plastics) having a modulus of elasticity of about 10 GPa. FRP constituting the connection section is formed according to, for example a SMC (Sheet Molding Compound) method or a BMC (Bulk Molding Compound) method. In the present embodiment, the connection section disposed in top plate 10 and bottom plate 20 and connected to diaphragm 50 is made of FRP. More specifically, regarding top plate 10, the entire part of top plate 10 including the connection section is made of FRP; and regarding bottom plate 20, a main body 22 serving as the connection section is made of FRP. It should be noted that the connection section disposed in top plate 10 and bottom plate 20 and connected to diaphragm 50 is not limited to FRP as mentioned in the present embodiment, and in at least one member of top plate 10 and bottom plate 20, the connection section connected to diaphragm 50 may be made of FRP. In addition, the other member of top plate 10 and bottom plate 20 than the one member in which the connection section and connected to diaphragm 50 is made of FRP may be made of metal such as iron or aluminum. As a constituent material for the connection section disposed in top plate 10 and bottom plate 20 and connected to the diaphragm, it is preferred to adopt FRP from the viewpoint of making the members lighter, and it is preferred to adopt metal such as iron or aluminum from the viewpoint of improving the strength of the members.

Figure 2:
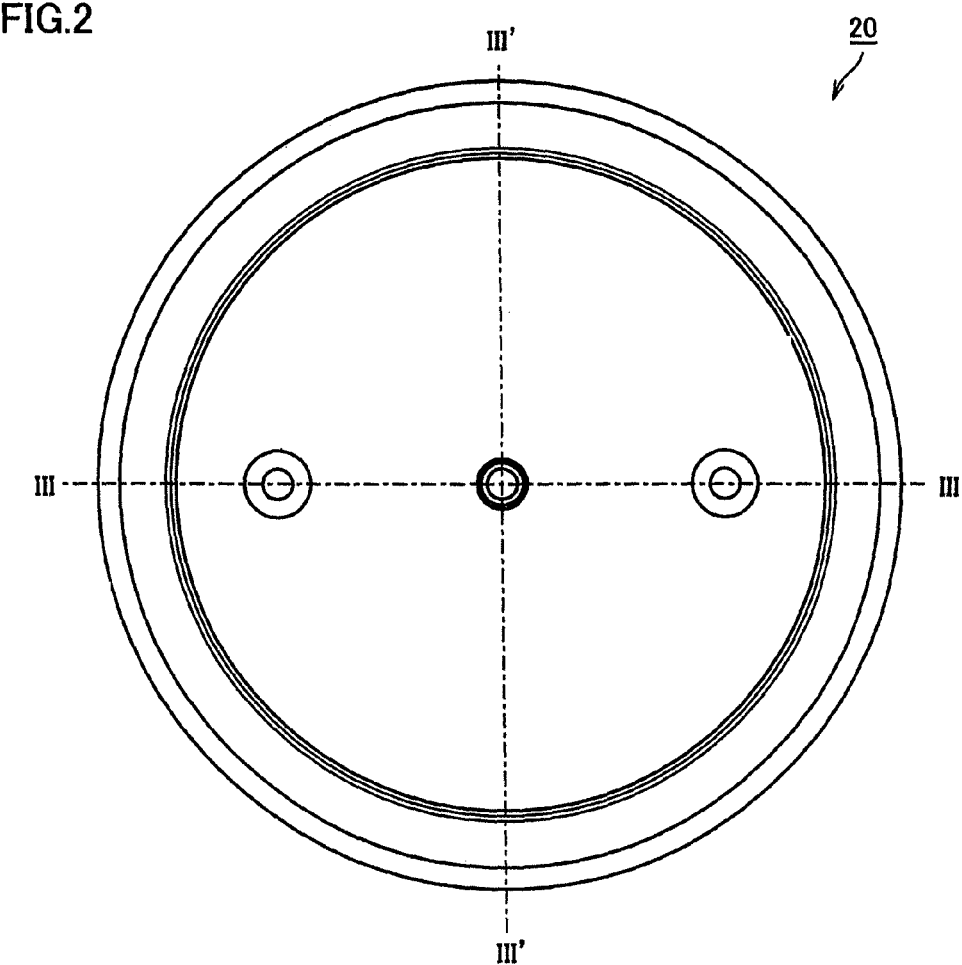
FIG. 2 is a schematic plain view illustrating a structure of a bottom plate.
Figure 3:
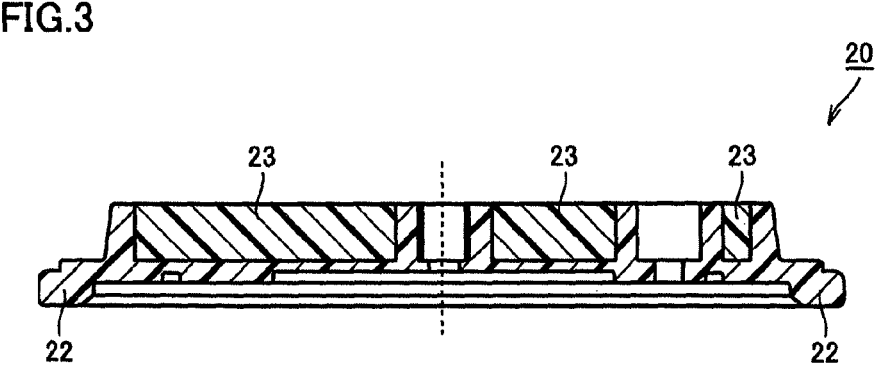
FIG. 3 is a schematic sectional view illustrating the structure of the bottom plate.

With reference to FIGS. 2 and 3, the structure of bottom plate 20 will be described in detail. In FIG. 3, the right part of the diagram relative to the central line represented by a dotted line in FIG. 3 partially illustrates a section of bottom plate 20 along a line segment in FIG. 2, and the left part of the diagram relative to the central line partially illustrates a section of bottom plate 20 along a line segment III'-III' in FIG. 2. Bottom plate 20 includes main body 22 made of FRP and a lightweight section 23. In order to make bottom plate 20 lighter, main body 22 is hollowed partially, and for the purpose of reinforcement, the hollowed part is filled with a material different from FRP to form lightweight section 23, and thereby, the mass per unit volume of the lightweight section is smaller than main body 22. Lightweight section 23 is made of, for example, a honeycomb material such as an aramid honeycomb or a paper honeycomb, a foamed material such as a plastic foam or a carbon foam, or engineering plastic. In bottom plate 20, main body 22 may be made of FRP excluding CFRP (Carbon Fiber Reinforced Plastics) and lightweight section 23 may be made of CFRP. Further, at least one member of top plate 10 and bottom plate 20 may include main body 22 and lightweight section 23, for example, top plate 10 may include main body 22 and lightweight section 23, or both top plate 10 and bottom plate 20 may include main body 22 and lightweight section 23. Furthermore, bottom plate 20 may not include lightweight section 23 but have a structure in which main body 22 is partially removed (hollowed) so as to make bottom plate 20 lighter.

With reference to FIG. 1, laminated rubber layer 40 is disposed at the side opposite to top plate 10 when viewed from bottom plate 20. Laminated rubber layer 40 includes a plurality of hard layers 41 made of metal or the like and elastic layers 42 made of rubber or the like, and has such a structure that hard layers 41 and elastic layers 42 are laminated alternately in the main load direction. Since laminated rubber layer 40 includes the plurality of elastic layers 42, it is elastically deformable. The central part of laminated rubber layer 40 is formed into a hollow section.

Lower rubber plate 30 is disposed in contact with laminated rubber layer 40 at the side opposite to top plate 10 when viewed from bottom plate 20. A truck-side spigot 31 is formed in a region containing the central axis of lower rubber plate 30, protruding toward the side opposite to laminated rubber layer 40. In other words, truck-side spigot 31, which serves as a protruding small-diameter member containing therein the central axis of lower rubber plate 30, is fixed on lower rubber plate 30. An O-ring 32 is fixed around the periphery of truck-side spigot 31. Lower rubber plate 30 is connected to the truck (not shown) through the intermediary of truck-side spigot 31. Air spring 1 supports the bodywork (not shown) on the truck (not shown) through a support surface 30a of lower rubber plate 30. It is preferred that lower rubber plate 30 is made of metal such as iron or aluminum from the viewpoint of improving the strength of the members or made of FRP or the like from the viewpoint of making the members lighter.

As mentioned above, in air spring 1 of the present embodiment, the modulus of elasticity of the material constituting the connection section disposed in top plate 10 and bottom plate 20 and connected to diaphragm 50 is greater than the modulus of elasticity of the rubber constituting diaphragm 50 and smaller than the modulus of elasticity of aluminum. Thus, in comparison with the case where the connection section is made of iron or aluminum, the difference of modulus of elasticity between the material constituting the connection section and the rubber constituting diaphragm 50 is small. Thereby, it is possible to prevent a gap, which is caused by the difference of modulus of elasticity, from being formed in the connection section between top plate 10 and diaphragm 50 and between bottom plate 20 and diaphragm 50. Thus, according to air spring 1 of the present embodiment, it is possible to prevent air from leaking out of diaphragm 50.

As mentioned above, in air spring 1 of the present embodiment, it is acceptable that the modulus of elasticity of the material constituting the connection section disposed in top plate 10 and bottom plate 20 and connected to diaphragm 50 is not less than 1 GPa and not more than 40 GPa. Accordingly, it is possible to prevent a gap from being formed in the connection section between top plate 10 and diaphragm 50 and between bottom plate 20 and diaphragm 50 more effectively. Consequently, it is possible to prevent air from leaking out of diaphragm 50 more effectively.

As mentioned above, in air spring 1 of the present embodiment, it is acceptable that the connection section disposed in top plate 10 and bottom plate 20 and connected to diaphragm 50 is made of FRP. In order to speed up the vehicle and save energy, it is required to make the members in the air spring lighter, and thereby, it is necessary to adopt a lightweight material as a constituent material for top plate 10 and bottom plate 20. As the constituent material, for example, it is possible to adopt magnesium which has a specific weight smaller than aluminum or iron; however, since the workability of magnesium is worse, there arises such a problem that the manufacturing cost of the members will increase. In contrast, in air spring 1 of the present embodiment, FRP which has the specific weight equivalent to magnesium and is superior in workability is adopted as the material to form the connection section connected to diaphragm 50, and thereby, it is possible to make the air spring lighter without deteriorating the workability of the members.

As mentioned above, in air spring 1 of the present embodiment, FRP constituting the connection section disposed in top plate 10 and bottom plate 20 and connected to diaphragm 50 may be formed according to the SMC method or the BMC method but not limited thereto. In other words, in air spring 1 of the present embodiment, FRP constituting the connection section disposed in top plate 10 and bottom plate 20 for connecting diaphragm 50 may be formed according to a press molding method. Thereby, it is possible to further improve the workability of top plate 10 and bottom plate 20 including therein the connection section.

As mentioned above, in air spring 1 of the present embodiment, bottom plate 20 may include main body 22 which is made of FRP and serves as the connection section connected to diaphragm 50, and lightweight section 23 which has a smaller mass per unit volume than main body 22. Thereby, it is possible to make the air spring further lighter.

As mentioned above, in air spring 1 of the present embodiment, lightweight section 23 of bottom plate 20 may be made of an aramid honeycomb or a paper honeycomb but not limited thereto. In other words, in air spring 1 of the present embodiment, it is only required that lightweight section 23 of bottom plate 20 is made of a honeycomb structure. Lightweight section 23 may also be made of a plastic foam or a carbon foam but not limited thereto. In other words, in air spring 1 of the present embodiment, it is only required that lightweight section 23 is made of a foamed material. Moreover, lightweight section 23 may be made of engineering plastic. By adopting such materials as the constituent material of lightweight section 23, it is easy to make the air spring lighter.

As mentioned above, in air spring 1 of the present embodiment, main body 22 of bottom plate 20 may be made of FRP excluding CFRP, and lightweight section 23 may be made of CFRP. Thereby, it is possible to make the air spring further lighter.

As mentioned above, in air spring 1 of the present embodiment, slide member 21 which is made of metal may be disposed on surface 20a of bottom plate 20 facing top plate 10. Thereby, it is possible to further improve abrasion resistance of bottom plate 20 in the case where top plate 10 and bottom plate 20 contact each other when the air spring is deflated. Furthermore, it is possible to further improve the strength of bottom plate 20.

As mentioned above, in air spring 1 of the present embodiment, slide member 21 which is made of resin may be disposed on surface 20a of bottom plate 20 facing top plate 10. Thereby, it is possible to further improve sliding property between top plate 10 and bottom plate 20 in the case where top plate 10 and bottom plate 20 contact each other when the air spring is deflated.

Figure 4:
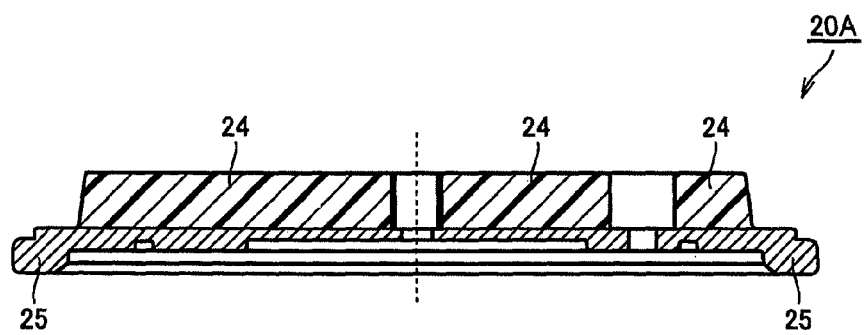
FIG. 4 is a schematic sectional view illustrating a structure of another bottom plate.

As mentioned above, in air spring 1 of the present embodiment, bottom plate 20 may have the structure (see FIG. 3) including main body 22 and lightweight section 23 but not limited thereto. With reference to FIG. 4, a bottom plate 20A (second support member) may include a main body 24 which serves as the connection section, and a reinforcement section 25 which is made of a material having a greater modulus of elasticity than main body 24. Similar to the case of bottom plate 20, main body 24 is made of FRP and reinforcement section 25 is made of a metal material such as iron or aluminum. Main body 24 and reinforcement section 25 are configured to have a disc-like shape (the diameter of reinforcement section 25 is greater), and main body 24 is disposed on reinforcement section 25 in such a way that both are sharing a common central axis. Thus, main body 24 which serves as the connection section connected to the diaphragm can be made of FRP to prevent air from leaking out of the diaphragm; and moreover, by forming reinforcement section 25 from a metal material such as iron or aluminum, it is possible to further improve the strength of bottom plate 20A.

Reinforcement section 25 may be made of a single metal such as iron or aluminum but not limited thereto. For example, reinforcement section 25 may be formed by embedding metal such as iron or aluminum in FRP. Moreover, for example, reinforcement section 25 may be formed by disposing a thin metal plate (not shown) made of iron or aluminum on a surface (top surface or bottom surface, or both) of FRP. In this case, the metal plate is used to connect the FRP part of reinforcement section 25 to main body 24.

Bottom plate 20A is not limited to the structure in which main body 24 is disposed on reinforcement section 25, and it may have, for example, such a structure that the main body made of FRP has a circular disc shape including a hollow section and the reinforcement section made of a metal material is disposed in the hollow section.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

INDUSTRIAL APPLICABILITY

The air spring of the present invention is advantageously applied to especially an air spring required to prevent air from leaking out of the diaphragm.

REFERENCE SIGNS LIST

1: air spring; 10: top plate; 10a, 20a: surface; 11: body-work-side spigot; 12, 32: O-ring; 20, 20A: bottom plate; 21: slide member; 22, 24: main body; 23: lightweight section; 25: reinforcement section; 30: lower rubber plate; 30a: support surface; 31: truck-side spigot; 40: laminated rubber layer; 41: hard layer; 42: elastic layer; 50: diaphragm

The invention claimed is:

1. An air spring comprising:
   a first support member;
   a second support member disposed with a distance in a main load direction from said first support member; and
   a diaphragm made of elastically deformable rubber and connecting said first support member and said second support member to form a closed space therebetween,
   in at least one member of said first support member and said second support member, a modulus of elasticity of a material constituting a connection section connected to said diaphragm being greater than a modulus of elasticity of said rubber constituting said diaphragm and smaller than a modulus of elasticity of aluminum,
   wherein said at least one member includes a main body and a lightweight section having a smaller mass per unit volume than said main body,
   said lightweight section is disposed in a recessed portion provided in said main body and is separated from said diaphragm, and
   said main body constitutes said connection section, and
   wherein said lightweight section is made of a honeycomb material, and
   said lightweight section is disposed between a center axis of said main body and said connection section in a direction parallel to a plane perpendicular to the center axis.

2. The air spring according to claim 1, wherein the modulus of elasticity of the material constituting said connection section in said at least one member is not less than 1 GPa and not more than 40 GPa.

3. The air spring according to claim 2, wherein said connection section is made of fiber reinforced plastic (FRP).

4. The air spring according to claim 3, wherein fiber reinforced plastic (FRP) constituting said connection section is formed through a press molding method.

5. The air spring according to claim 1, wherein said lightweight section is made of a foamed material.

6. The air spring according to claim 1, wherein said lightweight section is made of engineering plastic.

7. The air spring according to claim 1, wherein
   said connection section is made of fiber reinforced plastic (FRP) excluding carbon fiber reinforced plastic (CFRP), and
   said lightweight section is made of carbon fiber reinforced plastic (CFRP).

8. The air spring according to claim 1, wherein said at least one member includes said connection section and a reinforcement section made of a material having a greater modulus of elasticity than said connection section.

9. The air spring according to claim 1, wherein a member made of metal is disposed on at least one of a surface of said first support member facing said second support member and a surface of said second support member facing said first support member.

10. The air spring according to claim 1, wherein ,a member made of resin is disposed on at least one of a surface of said first support member facing said second support member and a surface of said second support member facing said first support member.

* * * * *